(12) United States Patent
Pfandl et al.

(10) Patent No.: US 12,466,670 B2
(45) Date of Patent: Nov. 11, 2025

(54) BUCKET WHEEL CHUTE ASSEMBLY

(71) Applicant: KOCH SOLUTIONS GMBH, Wadgassen (DE)

(72) Inventors: Hubert Pfandl, Styria (AT); Alexanda Damion Bozward, Perth (AU); Rudolf Pletz, Styria (AT); Christopher Robert Muller, Perth (AU); Georg Leitner, Styria (AT)

(73) Assignee: KOCH SOLUTIONS GMBH, Wadgassen (DE)

( * ) Notice: Subject to any disclaimer, the term of this patent is extended or adjusted under 35 U.S.C. 154(b) by 138 days.

(21) Appl. No.: 18/268,969

(22) PCT Filed: Dec. 20, 2021

(86) PCT No.: PCT/IB2021/062010
§ 371 (c)(1),
(2) Date: Jun. 21, 2023

(87) PCT Pub. No.: WO2022/137074
PCT Pub. Date: Jun. 30, 2022

(65) Prior Publication Data
US 2024/0059509 A1    Feb. 22, 2024

(30) Foreign Application Priority Data

Dec. 21, 2020  (DK) .......................... PA 2020 01439

(51) Int. Cl.
*B65G 65/20*  (2006.01)
*E02F 3/18*   (2006.01)
*E02F 7/06*   (2006.01)

(52) U.S. Cl.
CPC .............. *B65G 65/20* (2013.01); *E02F 3/181* (2013.01); *E02F 7/06* (2013.01)

(58) Field of Classification Search
CPC .............. B65G 65/20; E02F 3/181; E02F 7/06
See application file for complete search history.

(56) References Cited

U.S. PATENT DOCUMENTS

| | | | | |
|---|---|---|---|---|
| 3,774,741 A | * | 11/1973 | Johnson | B28C 5/4251 |
| | | | | 193/6 |
| 5,035,313 A | * | 7/1991 | Smith | B60P 3/16 |
| | | | | 193/6 |

(Continued)

FOREIGN PATENT DOCUMENTS

| | | | | |
|---|---|---|---|---|
| CN | 108569570 A | * | 9/2018 | .......... B65G 69/181 |
| CN | 110203711 A | * | 9/2019 | ............. B65G 65/04 |

(Continued)

OTHER PUBLICATIONS

IPSearch History Feb. 3, 2025 UTC; InnovationQ+ ; https://iq.ip.com/discover/searchhistory?id=5889731 (Year: 2025).*

(Continued)

*Primary Examiner* — Gene O Crawford
*Assistant Examiner* — Abby A Jorgensen
(74) *Attorney, Agent, or Firm* — LUCAS & MERCANTI, LLP; Klaus P. Stoffel

(57) ABSTRACT

A bucket wheel chute assembly comprising a frame and a bucket wheel chute. The bucket wheel chute comprising a plurality of wear plates. The bucket wheel chute comprising a first chute section and a second chute section and is detachably attached to the frame. At least one of the first chute section and second chute section is detachably attached to the frame by a first movable attachment means.

10 Claims, 4 Drawing Sheets

(56) References Cited

U.S. PATENT DOCUMENTS

| | | | | |
|---|---|---|---|---|
| 8,051,970 | B2* | 11/2011 | Shaber | B28C 5/4251 |
| | | | | 193/25 E |
| 12,152,365 | B2* | 11/2024 | Pletz | E02F 7/06 |
| 2002/0189916 | A1* | 12/2002 | Cole | B65G 11/186 |
| | | | | 193/4 |
| 2021/0355650 | A1* | 11/2021 | De Wet | E02F 3/188 |

FOREIGN PATENT DOCUMENTS

| | | | | | |
|---|---|---|---|---|---|
| EP | 439891 | A | * | 8/1991 | |
| JP | 2019006548 | A | * | 1/2019 | |
| KR | 20140074012 | A | * | 6/2014 | B65G 65/20 |
| WO | 2020077402 | A1 | | 4/2020 | |

OTHER PUBLICATIONS

International Search Report and Written Opinion dated Mar. 21, 2022, 12 pages.

* cited by examiner

BUCKET WHEEL CHUTE ASSEMBLY

FIELD OF INVENTION

The present invention relates to a bucket wheel chute assembly comprising an upper chute section and lower chute section. The chute sections are individually moveable to provide for easy access to components located behind the bucket wheel chute assembly such as the shaft and bearings. The invention further relates to a method of removing and optionally installing such a bucket wheel chute.

BACKGROUND

A bucket wheel assembly comprises several components such as a bucket wheel chute, bucket wheel shaft, and bucket wheel bearings. The shaft and bearings must from time to time be replaced or undergo maintenance. The bucket wheel chute is a wear part and must be replaced in regular intervals. The removal and/or maintenance of the components in the bucket wheel assembly is very time consuming. Typically, the bucket wheel chute comprises an inclined frame to which a number of wear plates are attached. The wear plates form the chute surface which during operations are contacted by bulk material. The chute surface is located within the periphery of the bucket wheel and ensures that bulk material released from the bucket wheel shovels is guided from the bucket wheel shovel on the periphery of the bucket wheel onto a conveyor system located adjacent the bucket wheel. The chute has a large area to restrict the bulk material from accessing the shaft and bearings protected by the bucket wheel chute. Because of this large size of the bucket wheel chute and due to its inclination it is typical required to disassemble the chute and remove the wear plates in order to remove the chute. This operation is very time consuming.

To access the components located behind the chute and perform maintenance to the bucket wheel shaft and bucket wheel bearings, all the wear plates and the frame will typically have to be dismantled. When reassembled the wear plates will have to be individually installed again.

Because these wear plates are individually removed the bucket wheel machine is typically out of operation for 6 days during maintenance, in order to provide time for removing the bucket wheel chute, refurbishing the shaft and drive, and remounting the bucket wheel chute.

It is therefore an object of the present invention to provide a bucket wheel chute which is faster to dismantle and install and which therefore can reduce the time required for maintenance of the bucket wheel assembly.

SUMMARY OF INVENTION

According to a first aspect of the invention a bucket wheel chute assembly is provided, said bucket wheel chute assembly comprising:
- a frame and a bucket wheel chute, the bucket wheel chute comprising a plurality of wear plates forming a chute surface, the bucket wheel chute comprising a first chute section and a second chute section, each of the first chute section and second chute section comprising at least one wear plate and is detachably attached to the frame, and
- wherein at least one of the first chute section and/or second chute section are detachably attached to the frame by a first movable attachment means configured for moving relative to the frame, such that the first chute section and second chute section may be at least partially separated while being attached to the frame.

During operation the first chute section and second chute section are located in an operating position. In this position the wear plates of the first chute section and second chute section together forms a single surface suitable for guiding bulk material to a conveying system. In the operating position the bucket wheel chute is located at least partially inside the bucket wheel and it may have an inclination with respect to vertical which allows the bucket wheel chute to guide bulk material from a number of buckets of the bucket wheel to the conveyor system located adjacent the bucket wheel. By providing a bucket wheel chute composed of several sections it is possible to remove each section individually without removing any of the wear plates. The removal of the chute can thereby be achieved much faster. Additionally, a replacement bucket wheel chute can be installed directly after removal and the removed bucket wheel chute may be refurbished on the ground or in a workshop providing a better and safer working environment.

The first chute section may be a lower chute section. The second chute section may be an upper chute section. The first chute section and second chute section may each comprise a number of wear plates. The first chute section and second chute section are configured for being removed from the frame while having the wear plates attached thereto.

The first chute section and second chute section are moveable in respect to each other while being attached to the frame. This allows the first chute section to be moved from the operating position adjacent the second chute section to a maintenance position. In the maintenance position the first chute section may be easily detached from the frame. When the first chute section and the second chute section has been separated the first chute section can be moved relative to the second chute section to provide a free space adjacent the second chute section. The second chute section may then be moved from the operating position to the free space. This movement allows the second chute section to move out of the bucket wheel periphery and allows it to be detached from the frame in a single piece.

In one or more embodiments the first chute section and the second chute section are individually detachable from the frame.

The bucket wheel chute may in one embodiment additionally or alternatively comprise three or more chute sections each comprising at least one wear plate and together forming the chute surface of the bucket wheel chute. The three or more chute sections are moveable in respect to the frame may be individually detached from the frame.

The frame has a distal end located towards the bucket wheel and a proximal end located towards the boom. In one or more embodiments the first moveable attachment means is configured to move in a direction from the distal end of the frame to the proximal end of the frame. This allows the first chute section comprising the first moveable attachment means to be moved away from the operating position while being attached to the frame. This provides access to several components protected by the bucket wheel chute and thereby allows for fast maintenance or inspection of these components without detaching the bucket wheel chute.

In one or more embodiment the first chute section is detachably attached to frame by a first moveable attachment means and the section chute section is detachably attached to the frame by a second movable attachment means.

In one or more embodiments the first chute section is configured to move from an operating position in which the first chute section contacts the second chute section, into a maintenance position in which the first chute section is separated from the second chute section thereby providing a free space adjacent the second chute section, and wherein the second chute section is configured to move towards to the free space when the first chute section is in the maintenance position.

In one or more embodiments the frame comprising at least one sliding member, and the first movable attachment means and/or second moveable attachment means is a sliding assembly configured to slide along the sliding member, preferably from the operating position to a maintenance position wherein the first chute section and second chute section are separated.

The wording "separated" should in this context be understood as the first chute section and second chute section is no longer in contact with each other.

By detachably attached is meant that the chute section can be attached and detached to the frame, moveable attachment means, or sliding assembly by common tools known to the skilled person. This may be fastening members such as bolts and nuts e.g. fastened using a bracket or a hinge.

Opposite of the chute surface, the bucket wheel chute has a back side. A mounting member may be located on the back side of the first chute section and/or the second chute section allowing the chute sections to be fastened to e.g. the frame. Additionally, one or more lifting blocks may be comprised on the back side of first chute section and/or second chute section, which allows for a lifting arrangement to be coupled thereto.

The first chute section may be attached to the first sliding assembly by means of the mounting member. The sliding member may be one or more rails arranged on the frame and allowing the sliding assembly to slide along the one or more rails. The mounting member may be located near an edge of the first chute section, preferably an upper edge of the first chute section. The mounting member may have a shape corresponding to the surface of the sliding assembly. Preferably the shape of the one or more rails and the corresponding shape of the mounting member allows the first chute section to pivot around the rail. This may as an example be achieved by a round rail and with a mounting member having a corresponding surface.

The frame may additionally comprise a support rail arranged adjacent the sliding member such that a part of the first chute section rests on the support rail to provide a desired inclination of the first chute section. In one or more embodiments the first sliding assembly allows the first chute section to slide in a direction along the frame, preferably in a direction from the distal end towards the proximal end.

In one or embodiments the bucket wheel chute assembly additionally comprising one or more actuator devices configured for moving the first chute section and/or second chute section. The one or more actuator devices may be mounted on the frame and connected to the first moveable attachment means and/or the second moveable attachment means. The one or more actuator devices may move the first chute section and the second chute section between an operating position and a maintenance position. The actuator device may be an electric or hydraulic actuator.

In one or more embodiments the first chute section and/or second chute section is configured to pivot relative to the frame such that a back side of the first chute section and/or second is oriented substantially upwards. By orienting the back side of the chute sections upwards the lifting blocks on the back side of the chute sections are easily available for coupling to a lifting arrangement.

Any terms such as upwards, downwards, vertical and horizontal are defined with regards to the direction of gravity.

By the wording "substantially upwards" is meant that a vector perpendicular to the back side of the first chute section and second chute section is either vertical or inclined with less than 90 degrees from vertical.

In one or more embodiments the bucket wheel assembly may further comprise a second sliding assembly attached to the frame and moveably attached to the second chute section. The second chute section may be attached to the second sliding assembly by means of a mounting member. The mounting members may be located in a lower part of the back side of the second chute section. The second sliding assembly allows the second chute section to slide from an operating position to a maintenance position.

The second sliding assembly may be one or more rails arranged on the frame and allowing the second chute section to slide along the one or more rails. The movement of the second chute section may be controlled by an actuator device. Once the first chute section has been moved from the operating position to the maintenance position, space is provided adjacent the second chute section and allows it to slide towards this position. In one or more embodiments the second chute section is an upper chute section and is configured to slide in a downwards direction. The direction may be perpendicular to the moving direction of the first chute section. This movement allows the chute to be moved from a position at least partially inside the periphery of the bucket wheel in such a way that the second chute section is clear of the bucket wheel.

In another aspect the invention relates to a bucket wheel assembly comprising a bucket wheel, a conveyor system and a bucket wheel chute assembly.

In yet another aspect the invention relates to a bucket wheel machine comprising such a bucket wheel assembly.

The bucket wheel assembly according to the invention allows for fast maintenance and thereby reduced time in which the bucket wheel machine is out of operation.

In another aspect of the invention a method is provided, in which method a bucket wheel chute is removed from a bucket wheel assembly. The method comprising the steps of:
  separating the first chute section from the second chute section by moving the first chute section relative to the second chute section thereby providing a free area adjacent the second chute section
  moving the second chute section towards the free area.

This method allows for faster and easier removal of the bucket wheel compared to the prior art methods, since the bucket wheel chute can be removed in two sections without removing any wear plates from the bucket wheel chute. The bucket wheel chute is located at least partially inside the periphery of the bucket wheel and is typically too large to be removed in a single piece. The first step of moving the first chute section, provides a free area for moving the second chute section out of the periphery.

By the wording removing a bucket wheel chute is meant that one or more chute sections are removed from an operating position to a maintenance position.

The first chute section may be a lower chute section. The second chute section may be an upper chute section.

In one or more embodiments the method comprises a step of pivoting the first and/or second chute section such that the back side of the chute section is oriented substantial upwards. By reorienting the chute sections the lifting blocks on the back side are accessible for being coupled to lifting arrangement.

In one or more embodiments the method further comprises the step of detaching the first chute section and/or the second chute section from the frame. Preferably this step is carried out after the first chute section and/or second chute section has been pivoted to orient the back sides upwards. In this position a lifting arrangement may be coupled to the lifting blocks where after the first chute section and/or second chute section may be detached from the frame and lifted off the bucket wheel chute assembly.

In one or more embodiments the first chute section is moved in the first direction by sliding along a sliding assembly. The sliding assembly being attached to a frame of the bucket wheel assembly.

In one or more embodiments the second chute section is moved towards the freed up space by sliding along a sliding assembly. The second chute section may be released from its operating position by detaching one or more fastening means or by activating one or more mechanical or hydraulic moving means, such as an actuator.

In one or more embodiments the moving of the first chutes section and/or second chute section is provided by one or more actuator devices.

In one or more embodiments the first chute section and the second chute section are lifted off the bucket wheel assembly by a crane. The step of lifting the first chute section and the second chute section may be initiated once they have been moved to the maintenance position. The lifting operation may be provided by a mobile crane on site or a similar lifting machine.

In one or more embodiments the method may additionally comprise the step of attaching a new or refurbished first chute section and second chute section.

BRIEF DESCRIPTION OF THE DRAWINGS

The invention will now be described in more details below by means of non-limiting examples of presently preferred embodiments and with reference to the schematic drawings, in which.

DETAILED DESCRIPTION OF EMBODIMENTS OF THE INVENTION

Figure 1:
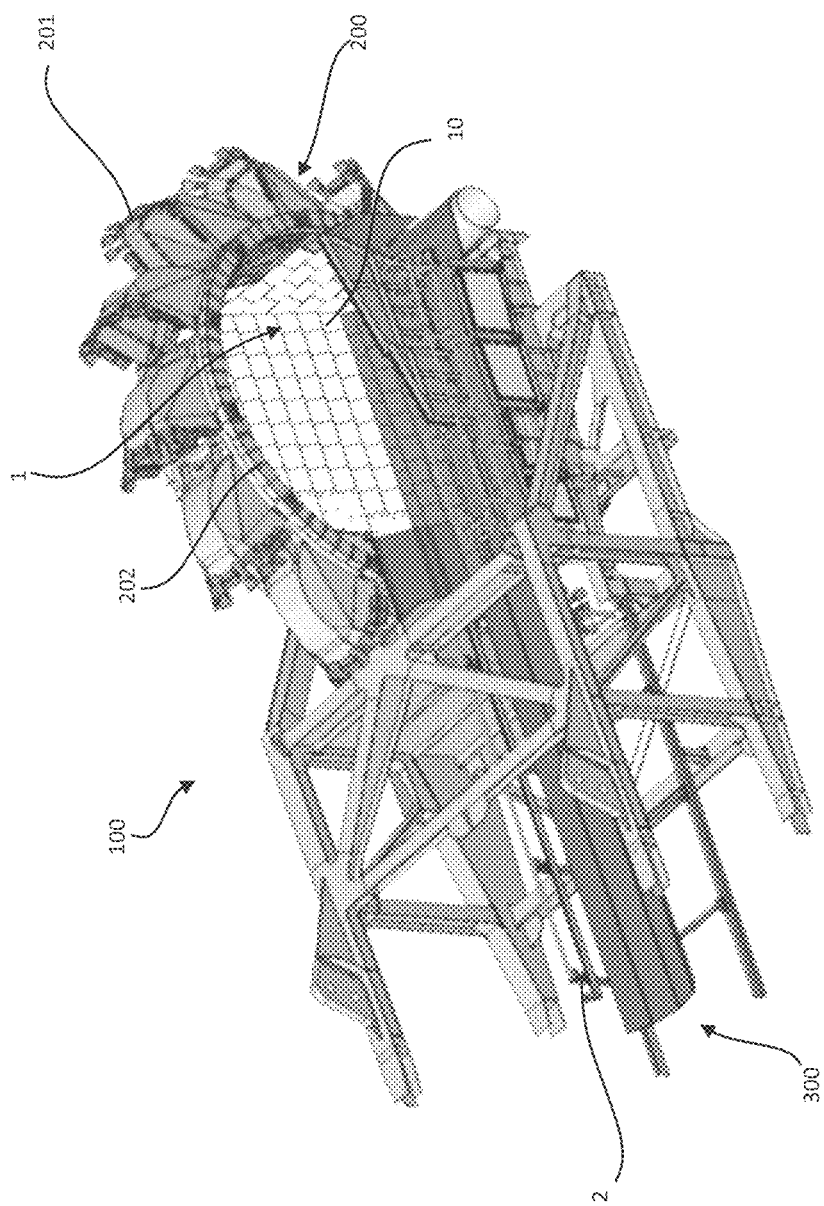
FIG. 1 shows a perspective view of a bucket wheel assembly comprising a bucket wheel chute assembly according to one embodiment of the invention.

FIG. 1 shows a bucket wheel assembly 100. The bucket wheel assembly 100 comprises a bucket wheel 200, a conveyor system 300, and a bucket wheel chute assembly 1. Such a bucket wheel assembly 100 is provided on a distal end of a boom of a bucket wheel machine (not shown). The Bucket wheel 200 comprises a number of buckets 201 arranged along the outside periphery of the bucket wheel 200. The bucket wheel 200 is configured for rotating. During intended use the bucket wheel 200 rotates and bulk material may be lifted upwards in the buckets 201. As the buckets 201 are rotated towards a top position, the bulk material is released from the buckets 201 onto a bucket wheel chute 10 of the bucket wheel chute assembly 1. The bucket wheel chute 10 ensures that the bulk material is guided onto the conveyor system 300. The conveyor system 300 conveys the bulk material from the bucket wheel 200, towards the opposite proximate end of bucket wheel machine for unloading or further conveying.

Figure 2:
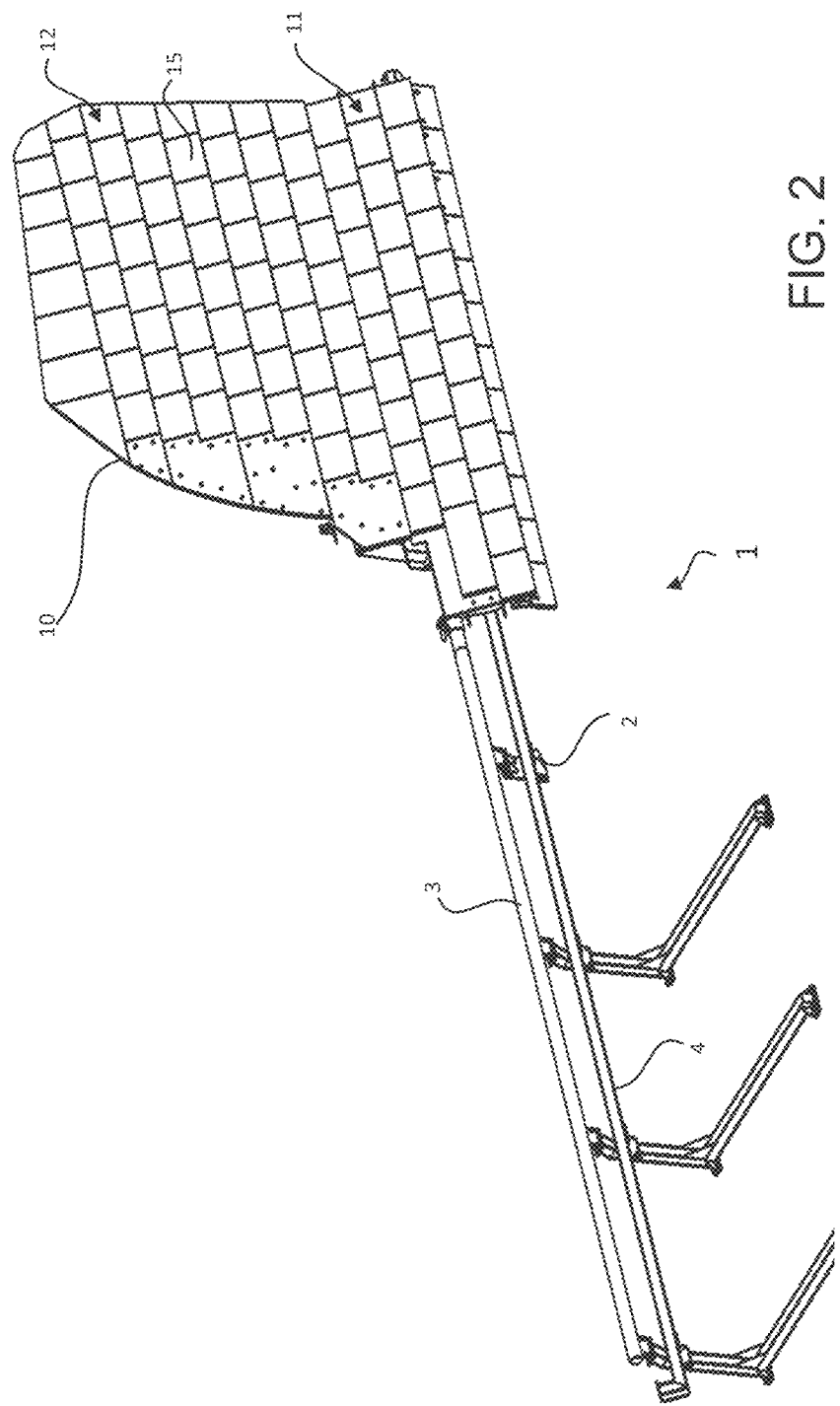
FIG. 2 shows a perspective view of a bucket wheel chute assembly comprising a first chute section and a second chute section located at an operating position according to an embodiment of the invention.

The bucket wheel chute assembly 1 is showed in further detail in FIG. 2. The bucket wheel chute assembly 1 comprises a frame 2 and a bucket wheel chute 10. The frame 2 is attached to the boom of a bucket wheel machine (not shown). The bucket wheel chute 10 is arranged partially inside the bucket wheel 200 and is inclined, which ensures that bulk material released from the buckets 201 is guided onto the conveyor system 120. The bucket wheel chute 10 is detachably attached to the frame 2. The bucket wheel chute 10 has a first chute section 11 and a second chute section 12 which are moveable in respect to each other. Each of the first chute section 11 and second chute section 12 have a plurality of wear plates 15 which on one side is fastened to the chute sections (11, 12) and the other side oriented upwards for being in contact with bulk material during use. When the first chute section 11 and second chute section 12 are in contact they from a single surface which ensures that bulk material is guided onto the conveyor system 300.

The first chute section 11 and second chute section 12 are configured for being detached from each other and for being detached from the frame 2. This allows for fast disassembling and reassembling because the entire bucket wheel chute 10 can be removed in two pieces without having any of the wear plates 15 removed. In the embodiment shown, the first chute section 11 is located below the second chute section 12. The first chute section 11 may be released from its operating position shown in FIG. 2 and being slided along an upper rail 3 on the frame 2 by means of a first sliding assembly 22. The first sliding assembly 22 is attached to the back side of the first chute section 11, opposite of the wear plates 15, and allows for moveably connecting the first chute section 11 to the upper rail 3.

Prior to moving the first chute section 11, one or more fastening members (not shown) are loosened. This allows the first chute section 11 to pivot around the upper rail 3 and slide towards a maintenance position. In the embodiment shown the sliding direction is parallel to the boom of the bucket wheel machine and is a direction oriented from distal end to the proximate end of the bucket wheel assembly 100.

Figure 3:
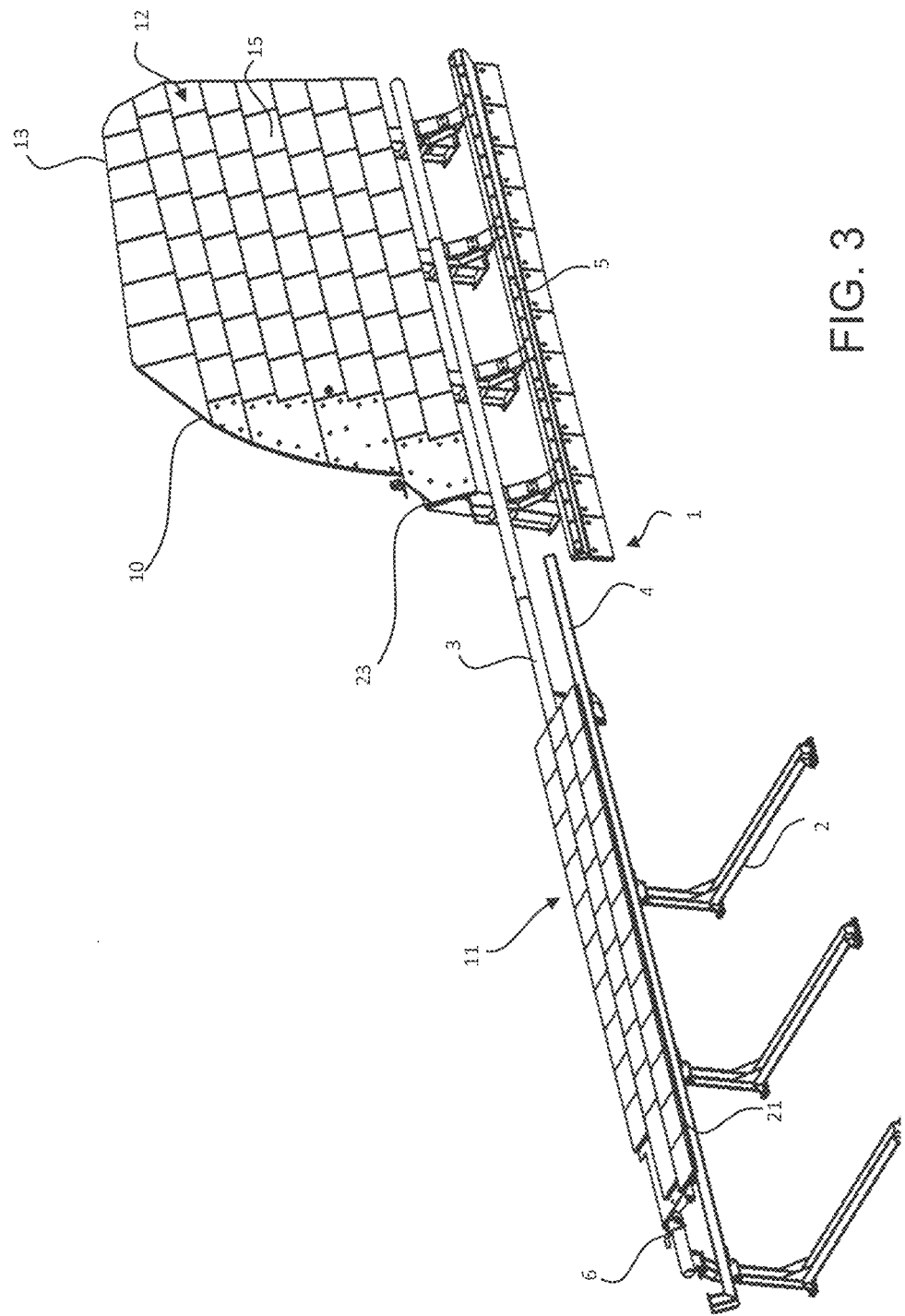
FIG. 3 shows a perspective view of a bucket wheel chute assembly comprising a first chute section and a second chute section according to an embodiment of the invention, in which the first chute section is at a maintenance position.

FIG. 3 shows first chute section 11 in its maintenance position, where a lower part of the first chute section 11 rests on a lower rail 4. The lower rail 4 ensures that the first chute section do not pivot onto the conveying system 300. It can be seen that the lower portion of the frame 2 comprises a recess 5 for engaging with the lower portion of the first chute section 11 when the first chute section 11 is in its operating position. To detach the first chute section 11 from the upper rail 3, lifting equipment from e.g. a crane is attached to a lifting block (not shown) on the back side of the first chute section 11. The lower portion 21 of the first chute section is then lifted upwards while pivoting around the upper rail 3. When the first chute section is in a substantially upright position it may be lifted off the upper rail 3 by releasing one or more hinges 6.

Figure 4:
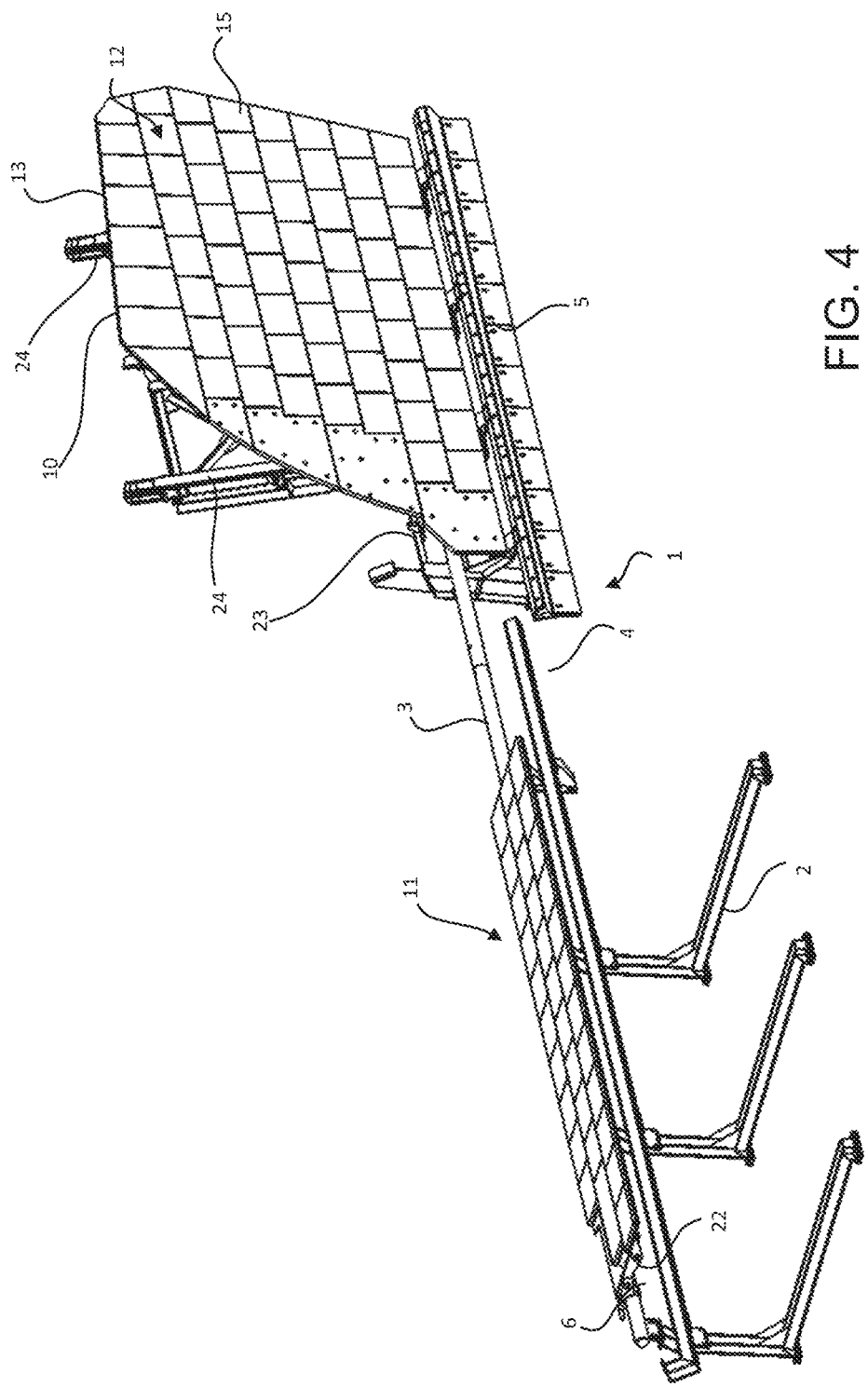
FIG. 4 shows a perspective view of a bucket wheel chute assembly comprising a first chute section and a second chute section according to an embodiment of the invention, in which the second chute section is at a maintenance position.

Once the first chute section 11 has been removed from its operating position it provides free space below the second chute section 12. The second chute section 12 is attached to a second sliding assembly 23. The second sliding assembly 23 is moveably attached to two sliding rails 24 which thereby allows the second chute section 12 to slide downwards towards the recess 5 and out of the periphery of the bucket wheel 200 along the sliding rails 24. The Second sliding assembly 23 is attached to the back side of the second chute section 12 in a lower portion of the second chute section 12. The second sliding assembly 23 comprises a hinge (not shown). When the second chute section 12 has been slided downwards towards the recess 5, and the upper edge 13 of the second chute section 12 is clear of the periphery 202, the second chute section 12 may pivot around the hinge and the upper edge 13 can be moved away from the bucket wheel 200. This is shown in FIG. 4. In this position a lifting block on the back side of the second chute section 12 is accessible and a crane can be connected thereto. The second chute section 12 can thereby be lifted off the frame 2.

A new or refurbished first chute section 11 and second chute section 12, can be attached to frame 2 by performing the removal steps in a reversed order.

The sliding movements and rotation of the first chute section 11 and second chute section 12 can be performed by a number of actuators (not shown). The actuator(s) may be remotely controlled.

LIST OF REFERENCE SIGNS

1 Bucket wheel chute assembly
2 Frame
3 Upper rail
4 Lower rail
5 Recess
6 Hinge
10 Bucket wheel chute
11 First chute section
12 Second chute section
13 Upper edge
15 Wear plates
21 Lower portion
22 first sliding assembly
23 second sliding assembly
24 Sliding Rails
100 Bucket wheel assembly
200 Bucket wheel
201 Bucket(s)
202 Bucket wheel periphery
300 Conveyor system

The invention claimed is:

1. A bucket wheel chute assembly comprising:
a frame and a bucket wheel chute, the bucket wheel chute comprising a plurality of wear plates forming a chute surface, the bucket wheel chute comprising a first chute section and a second chute section, each of the first chute section and second chute section comprising at least one wear plate and is detachably attached to the frame, and wherein at least one of the first chute section and second chute section is detachably attached to the frame by a first movable attachment means configured for moving relative to the frame, such that the first chute section and second chute section may be at least partially separated while being attached to the frame, wherein the first chute section is detachably attached to the frame by a first moveable attachment means and the second chute section is detachably attached to the frame by a second movable attachment means.

2. The bucket wheel chute assembly according to claim 1, wherein the first chute section and the second chute section are individually detachable from the frame.

3. The bucket wheel chute assembly according to claim 1, wherein the frame has a distal end and a proximal end and wherein the first moveable attachment means is configured to move in a direction from the distal end of the frame to the proximal end of the frame.

4. A bucket wheel chute assembly comprising:
a frame and a bucket wheel chute, the bucket wheel chute comprising a plurality of wear plates forming a chute surface, the bucket wheel chute comprising a first chute section and a second chute section, each of the first chute section and second chute section comprising at least one wear plate and is detachably attached to the frame, and wherein at least one of the first chute section and second chute section is detachably attached to the frame by a first movable attachment means configured for moving relative to the frame, such that the first chute section and second chute section may be at least partially separated while being attached to the frame, wherein the frame comprising at least one sliding member and wherein the first movable attachment means and/or second moveable attachment means is a sliding assembly configured to slide along the sliding member.

5. The bucket wheel chute assembly according to claim 1, wherein the first chute section is configured to move from an operating position in which the first chute section contacts the second chute section, into a maintenance position in which the first chute section is separated from the second chute section thereby providing a free space adjacent the second chute section, and wherein the second chute section is configured to move towards to the free space when the first chute section is in the maintenance position.

6. The bucket wheel chute assembly according to claim 1, wherein the first chute section and/or second chute section is configured to pivot relative to the frame such that a back side of the first chute section and/or second chute section may be oriented substantially upwards.

7. The bucket wheel chute assembly according to claim 1, wherein the bucket wheel chute assembly additionally comprising one or more actuator devices configured for moving the first chute section and/or second chute section.

8. A method for removing a bucket wheel chute from a bucket wheel chute assembly comprising:
a frame and a bucket wheel chute, the bucket wheel chute comprising a plurality of wear plates forming a chute surface, the bucket wheel chute comprising a first chute section and a second chute section, each of the first chute section and second chute section comprising at least one wear plate and is detachably attached to the frame, and wherein at least one of the first chute section and second chute section is detachably attached to the frame by a first movable attachment means configured for moving relative to the frame, such that the first chute section and second chute section may be at least partially separated while being attached to the frame the method comprising the steps of:
separating the first chute section from the second chute section by moving the first chute section relative to the second chute section thereby providing a free area adjacent the second chute section; and
moving the second chute section towards the free area.

9. The method for removing a bucket wheel chute according to claim 8, wherein the method further comprises the step of pivoting the first chute section and or second chute section relative to the frame such that the back side of the first chute section and/or second chute section is oriented substantially upwards.

10. The method for removing a bucket wheel chute according to claim 8, wherein the method further comprises the step of detaching the first chute section and/or the second chute section from the frame.

* * * * *